(12) United States Patent
Perry

(10) Patent No.: US 6,305,344 B1
(45) Date of Patent: Oct. 23, 2001

(54) METHOD AND APPARATUS FOR CONTROLLING FUEL TO AN ENGINE DURING COOLANT FAILURE

(75) Inventor: Paul A. Perry, Taylor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/677,608

(22) Filed: Oct. 3, 2000

(51) Int. Cl.$^7$ .................................................. F02B 77/00
(52) U.S. Cl. ..................... 123/198 F; 123/41.15
(58) Field of Search ............................ 123/198 F, 41.15

(56) References Cited

U.S. PATENT DOCUMENTS 4,473,045 * 9/1984 Bolander et al. ................. 123/41.15

* cited by examiner

Primary Examiner—Noah P. Kamen
(74) Attorney, Agent, or Firm—Christopher DeVries

(57) ABSTRACT

A method of cooling an internal combustion engine having a first group of fuel injectors supplying fuel to a first group of injectors and a second group of fuel injectors supplying fuel to a second group of cylinders, the method including the steps of measuring the temperature of the engine, determining if the temperature of the engine exceeds a predetermined temperature threshold, shutting off the first group of fuel injectors to the first number of cylinders where air is pumped through the first number of cylinders to cool the first number of cylinders, energizing the second group of fuel injectors to the second group of cylinders to provide an air/fuel mixture to the second group of cylinders to drive the engine, shutting off at least one of the second group of fuel injectors to the second group of cylinders to pump air through at least one of the second group of cylinders.

12 Claims, 3 Drawing Sheets

METHOD AND APPARATUS FOR CONTROLLING FUEL TO AN ENGINE DURING COOLANT FAILURE

TECHNICAL FIELD

The present invention relates to a method and apparatus for controlling the air fuel mixture supplied to an internal combustion engine. More specifically, the present invention relates to a method and apparatus for controlling the air/fuel mixture to an internal combustion engine during the period of a cooling system failure to extend the operating time of the engine.

BACKGROUND OF THE INVENTION

It is well known in the art of internal combustion engines that extended operation of an internal combustion engine after a cooling system failure will result in excessive engine temperature. When a failure occurs that results in loss of engine coolant or a blockage prevents the circulation of the coolant, the temperature will rise relatively quickly to a level that may result in engine damage. An operator of the vehicle will have a limited time and operating range to drive the vehicle to a location where the cooling system may be repaired to allow normal engine operation. It would be desirable upon the occurrence of a cooling system failure to provide the vehicle with an alternate cooling system independent of the liquid coolant system and/or to extend the safe operating time of the vehicle.

SUMMARY OF THE INVENTION

The present invention is a method and apparatus for providing an alternate cooling system for an internal combustion engine to allow operation of the internal combustion engine for an extended period of time upon the failure of the primary conventional liquid coolant system (limp home or "camel" mode). The present invention alternately inhibits the fuel supply to different cylinders or groups of cylinders in an internal combustion engine for predetermined time periods so that each of the cylinders or groups of cylinders alternately induct an air/fuel mixture and air. Accordingly, the cylinders will soak or cool while inducting air only. The air fuel ratio of the mixture inducted is controlled by the position of the throttle plate and air/fuel mixture. U.S. Pat. No. 4,473,045 to Bolander et al. describes a method and apparatus for controlling fuel to an engine during coolant failure and is expressly incorporated by reference herein.

It is an object of the present invention to provide a system for controlling the operation of an internal combustion engine subsequent to a coolant system failure.

It is another object to provide an alternate cooling system for an internal combustion engine that may operate without liquid engine coolant.

BRIEF DESCRIPTION OF THE DRAWINGS

The various advantages of the present invention will become apparent to one skilled in the art upon reading the following specification and by reference to the drawings in which.

DESCRIPTION OF THE PREFERRED EMBODIMENT

Figure 1:
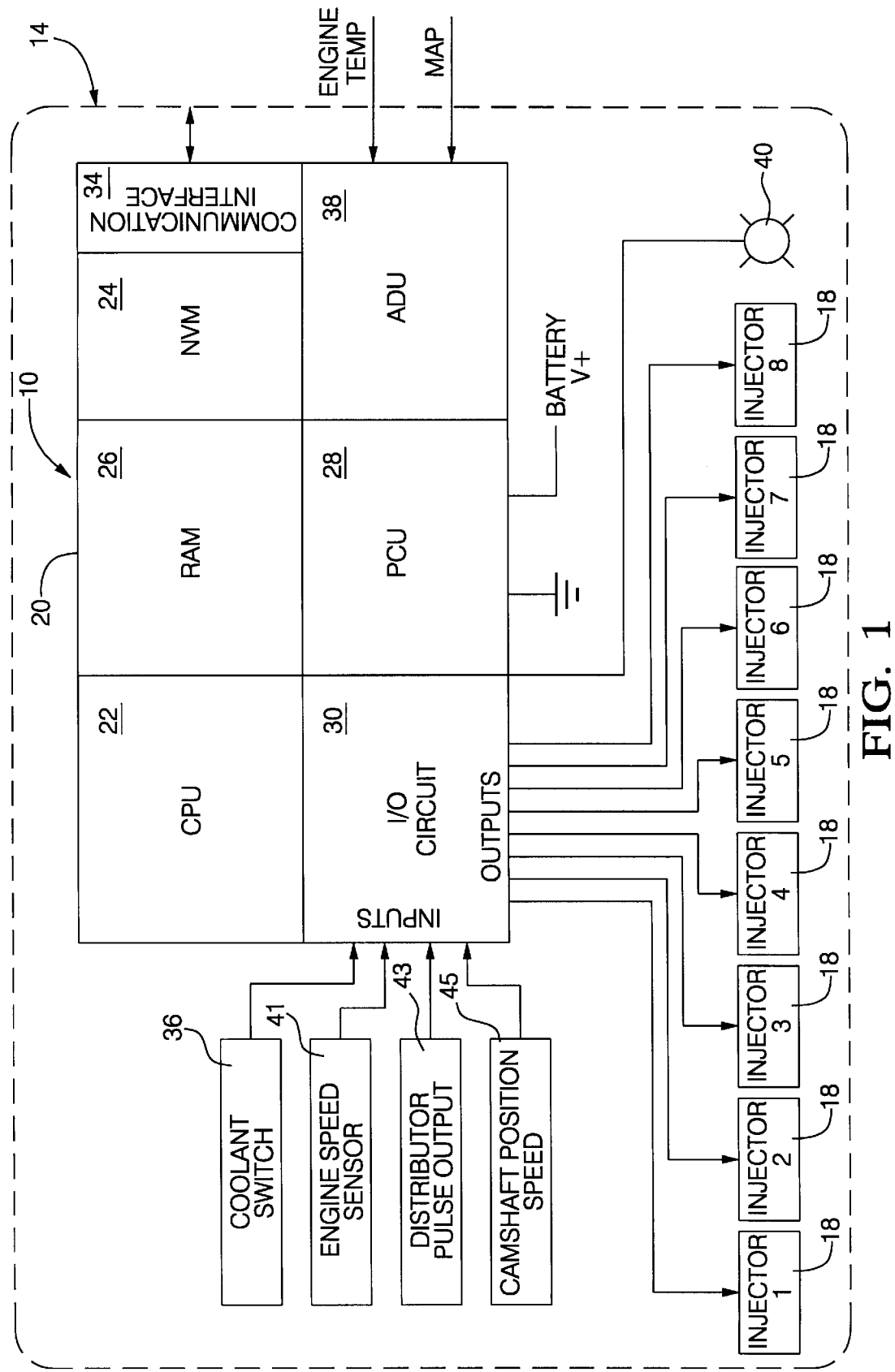
FIG. 1 is a diagrammatic drawing of a fuel injection system for an internal combustion engine incorporating the principles of this invention.
Figure 2:
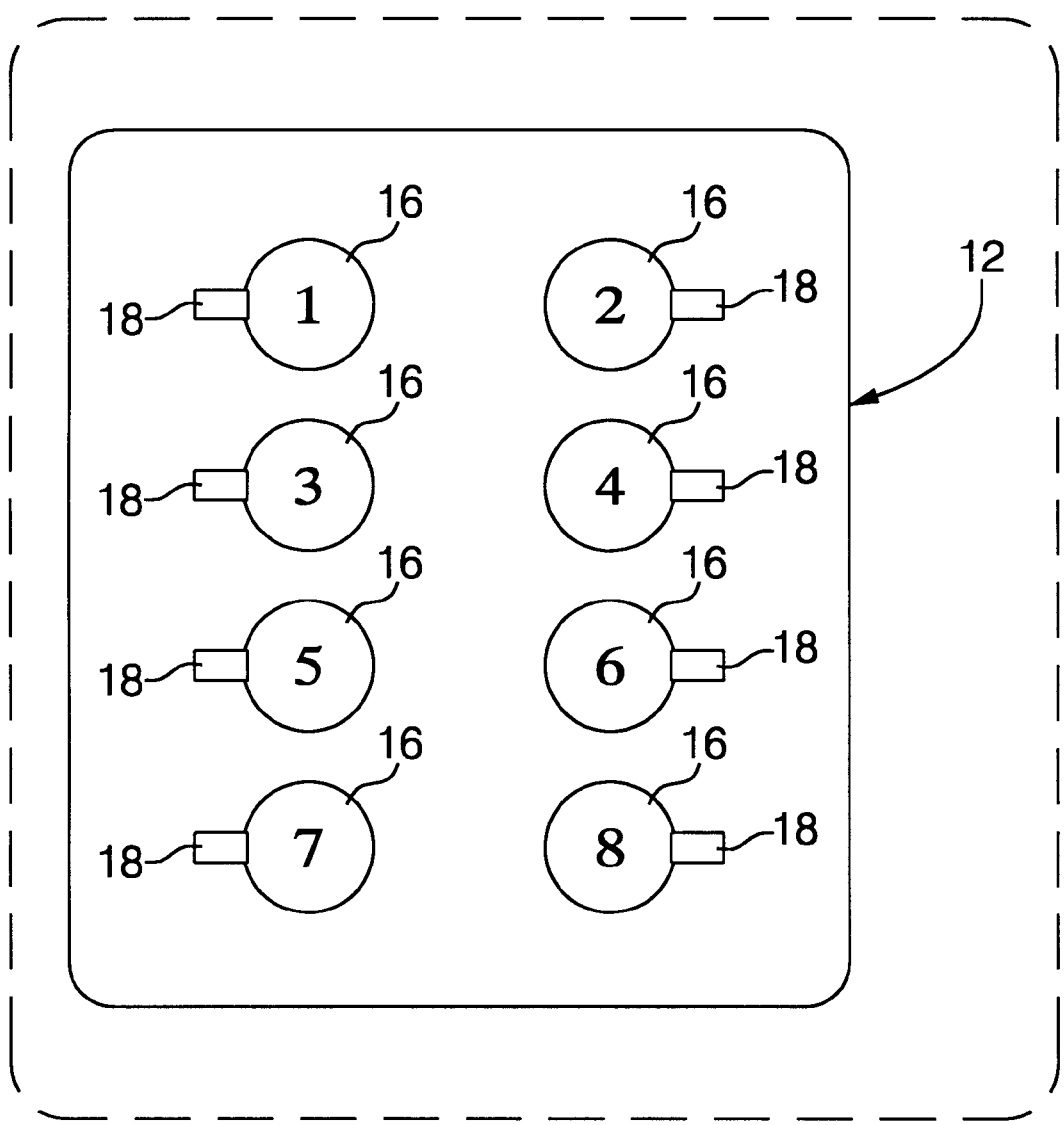
FIG. 2 is a diagrammatic drawing of the cylinder arrangement for an internal combustion engine.

Referring to FIGS. 1 and 2, there is illustrated a fuel control system 10 for a port fuel injected eight-cylinder internal combustion engine (ICE) 12 to drive or propel a vehicle 14. The ICE 12 includes two banks of cylinders 16 with each cylinder 16 being provided with fuel at its intake port by an electromagnetic fuel injector 18 which is supplied with pressurized fuel. When energized, each fuel injector 18 opens to supply metered amounts of fuel to the intake port of the respective cylinders 16.

While a port fuel injected ICE is shown in the present embodiment, the ICE 12 may comprise a direct injection ICE in alternate embodiments. Furthermore, while an eight-cylinder engine is described in the present invention, any multi-cylinder engine configuration is considered within the scope of the present invention.

Referring to FIG. 1, an engine control module (ECM) 20 is shown and takes the form of a digital computer, controller, microprocessor, or other similar control device, but is not limited to such. The ECM 20 includes a central processing unit (CPU) 22 which executes an operating program stored in nonvolatile memory (NVM) 24 such as ROM, EPROM, flash memory, or other similar memory devices, but is not limited to such. The NVM 24 also stores tables, calibration values, and constants utilized to control the ICE 12. Contained within the CPU 22 are conventional counters, registers, accumulators, flip flops, etc., along with a clock providing a high frequency clock signal for the timing of the CPU 22 and other devices in the ECM 20.

The ECM 20 further includes a random access memory (RAM) 26 in which data may be temporarily stored and from which data may be read at various address locations determined in accord with the program stored in NVM 24. A power control unit (PCU) 28 in the ECM 20 receives power from a conventional car battery to power the ECM 20. The PCU 28 conditions the car battery voltage to provide all the voltage ranges and forms required by the ECM 20.

The ECM 20 also includes an input/output (IO) circuit 30 and analog to digital unit (ADU) 38 which may be connected to multiple sensors, actuators and indicators. The sensors may include engine or wheel speed sensors such as proximity switches or hall effect sensors, engine temperature sensors, manifold air pressure and flow sensors, oxygen sensors, coolant level switches, coolant temperature switches, and any other sensors which may be used for the operation of an ICE. The outputs of the I/O circuit 30 energize, the fuel injectors 18, light pilot lights or indicators such as a warning indicator 40 for high engine temperature, high coolant temperature, or low coolant level, and any other actuators or indicators which may be used in an ICE.

The I/O circuit 30 includes an input counter section to receive a pulsed output from an engine speed sensor 41, a distributor pulse output 43 which generates a pulse for each engine cycle, and/or a cam shaft position/speed pulse sensor 45. The pulses from the engine speed sensor 41 are used to determine engine speed, and the distributor pulses or camshaft pulses are used to determine engine crankshaft speed and position and thus cylinder 16 positions for the initiating and energization of the fuel injectors 18.

In alternate embodiments of the present invention, an automotive communication network interface 34 is contained within the ECM 20 to provide communication to sensors and other devices over an automotive communications network. The automotive communications network may comprise any known vehicle communication system such as IES-CAN, GMLAN, KWP2000, J1850, CCD, or J1939, but is not limited to such. In the present invention, engine coolant level or a high coolant temperature may be sensed by a discrete signal to represent the state of coolant in the ICE 12. Alternatively, a sensor providing an analog signal representative of coolant level or coolant temperature may also be used. The discrete signal is provided by a conventional liquid level-sensing element or heat sensitive switch 36 in the cooling system and applied to a discrete input of the I/O circuit 30.

Analog signals representing conditions upon which the injection pulse widths are based for the fuel injectors 18 for normal operation and determining a coolant system failure are supplied to the analog inputs of the ADU 38. In the preferred embodiment, the analog signals include a manifold absolute pressure (MAP) signal provided by a conventional pressure sensor, an engine metal temperature or coolant temperature signal provided by a conventional temperature sensing element. The coolant temperature sensing element is preferably located near the flow of exhaust gases.

The CPU 22 reads and stores the high or low state of the discrete inputs and the analog inputs in a designated RAM 26 location in accord with the operating program stored in NVM 24. The CPU 22 then executes programming to determine further actions for the ICE 12.

In general, and in the absence of a coolant system failure, the fuel injectors 18 are energized with each intake event for each cylinder 18 for a time duration determined to provided a predetermined air/fuel ratio such as the stoichometric ratio for normal vehicle operation. This is accomplished by calculating the required pulse width based on mass air flow determined from the measured manifold absolute pressure and the volume of the cylinders 16, the known injector 18 flow rates, and the desired air/fuel ratio. The injection pulses are issued to the fuel injectors 18 and any required electrical drivers, via the I/O circuit 30 under control of the CPU 22, for providing the desired injection time, flow rates, and/or injection quantity. In the event of a coolant system failure which results in a loss of coolant or an increase in the engine and/or coolant temperature above a predetermined level, the CPU 22 outputs a signal via the I/O circuit 30 to energize the warning indicator 40 to indicate the coolant failure. At the same time, the CPU 22 alternately inhibits the supply of fuel to a cylinder 16 or groups of cylinders 16 for a predetermined numbers of engine cycles or predetermined time periods substantially greater than the period of engine cycle. The cylinder 16 or cylinders 16 will then alternately induct an air/fuel mixture and air. The cylinder 16 or group of cylinders 16 inducting only air will be cooled by the inducted air. After a predetermined number of engine cycles or predetermined time period, such as 15 seconds, alternate cylinders 16 or groups of cylinders 16 will induct air to also be cooled, extending the safe operating time of the ICE 12. The periodic cooling of each cylinder 16 or group of cylinders 16 decreases or in some cases eliminates the increase of heat in the ICE 12 due to the coolant failure.

In the preferred embodiment, a V-8 internal combustion engine 12 may be configured with the fuel control system 10 of the present invention, as seen in FIG. 2. The cylinders 16 have been numbered 1–8 to designate their positions in FIG. 2 and the firing sequence of their associated fuel injectors 18. When a loss of coolant, as detected by the coolant level sensor or a coolant temperature sensor 36 is detected in the ICE 12, the system 10 will enter the limp or camel mode. This mode fires some injectors 18 and skips other according to a predetermined sequence. The firing cylinders 16 provided with fuel and spark provide power to move the vehicle 14. The non-firing cylinders 16 deprived of fuel pump only air to cool or soak the ICE 12.

The working injectors 18 and cylinders 16, in a first step, decrease from eight cylinders to four cylinders by dropping out one fuel injector 18 per two revolutions of the crankshaft of the ICE 12. This gradual deactivation of injectors 18 will smoothly transition the ICE 12 between the use of eight cylinders 16 to the use of a four cylinder 16 group. When four cylinder 16 injecting is reached, the present invention will then move to injecting fuel in only three of the four cylinders 16 of this group. After a predetermined number of engine cycles, the switch is made to supply fuel to a new group of four cylinders 16 and eventually to three of the four cylinders 16 of this new group. This alternation of providing fuel to four cylinder 16 groups followed by providing fuel to only three of the four cylinders 16 in the group will continue until the coolant system failure is corrected. This method provides additional soak time or cooling time to the one cylinder 16 not firing in the group of four cylinders 16, increasing the operating range of the vehicle 14 and substantially preventing an increase of temperature into the range that may cause engine damage.

Furthermore, the reduced power level provided by only three or four cylinders 16 propelling the vehicle 14 will indicate to the operator, in conjunction with the warning indicator 40, that there is a problem and maintenance is required. If the operator chooses to continue to drive the vehicle 14, the throttle will have to be wide open in order to maintain a normal cruising speed such as 50 mph. The increased airflow caused by the wide open throttle will result in more cooling to the ICE 12 and provide a physical limit on vehicle speed.

Figure 3:
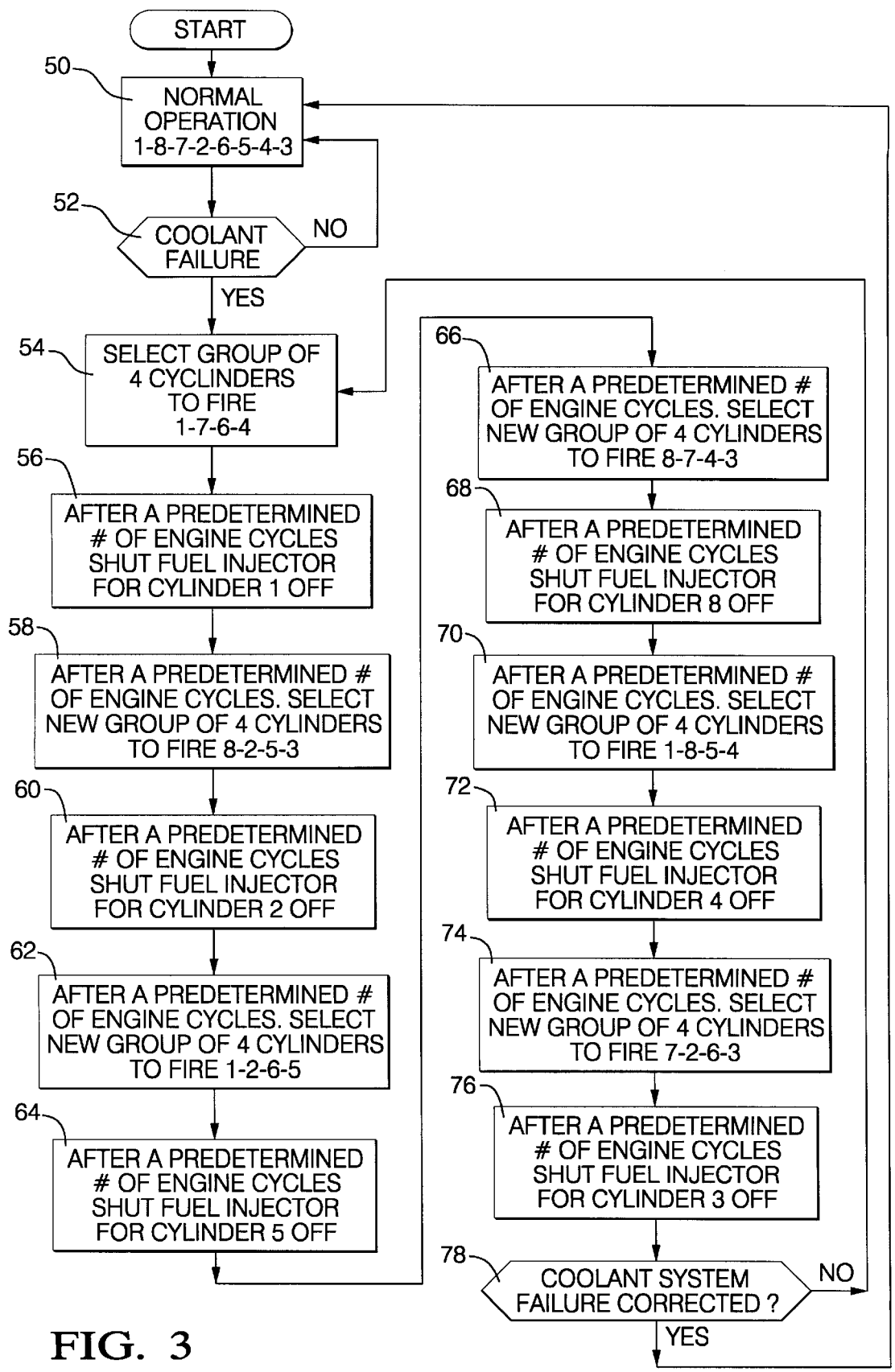
FIG. 3 is a flow chart of the preferred method of the present invention.

Referring to FIG. 2 and the flow chart of FIG. 3, in the preferred embodiment of the present invention, at block 50, the sequence 1-8-7-2-6-5-4-3 is followed in firing the fuel injectors 18 for cylinders 16 during normal operation of the ICE 12. Upon detection of a coolant failure or high coolant temperature at block 52, the system 10 will enter the camel mode at block 54 to systematically shut off a series of fuel injectors 18 until only a group of four cylinders, 1-7-6-4, are firing and the remaining cylinders 16 are cooling. After a first number of predetermined engine cycles at block 56, the fuel injector 18 providing fuel to cylinder 1 will be shut off, leaving cylinders 1-7-6-4 firing and cylinder 1 cooling. At block 58, after a second number of predetermined of engine cycles, a new group fuel injectors 18 providing fuel for four cylinders, 8-2-5-3, will fire and cylinders 1-7-6-4 will pump air to cool. At block 60, after a third number of predetermined engine cycles, the fuel injector 18 providing fuel to cylinder 2 will be shut off, leaving cylinders 8-5-3 firing and cylinder 2 cooling. At block 62, after a fourth number of predetermined engine cycles, a group of fuel injectors 18 providing fuel for four cylinders 1-2-6-5 will fire. At block 64, after a fifth number of predetermined engine cycles the fuel injector 18 to cylinder 5 will be shut off, leaving cylinders 1-2-6 firing and cylinder 5 cooling. At block 66, after a sixth number of predetermined engine cycles, a group of fuel injectors 18 for four cylinders 8-7-4-3 will fire. At block 68, after a seventh number of predetermined engine cycles, the fuel injector 18 providing fuel to cylinder 8 will be shut off, leaving cylinders 7-4-3 firing and cylinder 8 cooling. At block 70, after an eighth number of predetermined engine cycles, a group of fuel injectors providing fuel to cylinders 1-8-5-4 will fire. At block 72, after a ninth number of predetermined engine cycles, the fuel injector 18 providing fuel to cylinder 4 will be shut off, leaving cylinders 1-8-5 firing and cylinder 4 cooling. At block 74, after a tenth number of predetermined engine cycles, a group of fuel injectors 18 providing fuel for cylinders 7-2-6-3 will fire. At block 76, after an eleventh number of predetermined engine cycles, the fuel injector 18 providing fuel to cylinder 3 will be shut off, leaving cylinders 7-2-6 firing and cylinder 3 cooling. At block 78 the system 10 is checked to see if the coolant system failure has been corrected. If the coolant system failure has been corrected, then the routine will continue to block 50 and execute normal operation. If the cooling system failure has not been corrected, the routine will continue to block 54 and continue with the camel mode. In the preferred embodiment, all of the predetermined numbers of engine cycles are equal, but in alternate embodiments the predetermined numbers of engine cycles may be any number of engine cycles. Furthermore, in alternate embodiments of the present invention, the routine may begin normal operation at step 50 whenever the coolant system failure has been corrected.

While this invention has been described in terms of some specific embodiments, it will be appreciated that other forms can readily be adapted by one skilled in the art. Accordingly, the scope of this invention is to be considered limited only by the following claims.

What is claimed is:

1. A method of cooling an engine having a plurality of cylinders after a loss of coolant, the method comprising:

injecting fuel, via a first number of fuel injectors, into a first number of cylinders, the first number of cylinders being less than the total number of the plurality of cylinders;

shutting off said first number of fuel injectors;

activating a second number of fuel injectors fluidly coupled to a second number of cylinders after a predetermined time or number of engine cycles, the second number of cylinders being less than the total number of the plurality of cylinders, wherein the first group of cylinders comprises at least four cylinders and the second number of cylinders comprises at least four cylinders; and shutting off at least one of the second number of fuel injectors when the second number of fuel injectors is active, whereby three of the second number of fuel injectors are active, allowing one of the second number of cylinders to cool.

2. The method of claim 1 further comprising the step of monitoring coolant level.

3. The method of claim 1 further comprising the step of monitoring coolant temperature.

4. The method of claim 1 further comprising the step of mounting a coolant temperature sensor near an exhaust gas flow of the engine.

5. A method of cooling an internal combustion engine having a plurality of cylinders, a plurality of fuel injectors, the method of cooling comprising;

measuring the temperature of an engine;

determining if the temperature of the engine exceeds a predetermined temperature threshold;

shutting off a first number of fuel injectors to a first number of cylinders if the temperature of the engine exceeds the predetermined threshold;

pumping air through the first number of cylinders to cool the engine;

providing fuel to a second number of cylinders via a second number of fuel injectors;

shutting off at least one of the second number of fuel injectors to allow at least one of the second number of cylinders to cool; and alternating the shut off of the at least one of the second number of fuel injectors among the group of the second number of fuel injectors.

6. The method of claim 5 wherein the step of measuring engine temperature comprises measuring engine block temperature.

7. The method of claim 5 wherein the step of measuring engine temperature comprises measuring engine coolant temperature.

8. The method of claim 5 further comprising the step of locating a coolant temperature sensor near exhaust gases of the engine.

9. A method of cooling an internal combustion engine having a first group of fuel injectors supplying fuel to a first group of injectors and a second group of fuel injectors supplying fuel to a second group of cylinders, the method comprising:

measuring the temperature of the engine;

determining if the temperature of the engine exceeds a predetermined temperature threshold;

shutting off the first group of fuel injectors to the first number of cylinders wherein air is pumped through the first number of cylinders to cool the first number of cylinders;

energizing the second group of fuel injectors to the second group of cylinders to provide an air/fuel mixture to the second group of cylinders to drive the engine; and shutting off at least one of the second group of fuel injectors to the second group of cylinders to pump air through at least one cylinder of the second group of cylinders.

10. The method of claim 9 wherein the step of measuring engine temperature comprises measuring engine block temperature.

11. The method of claim 9 wherein the step of measuring engine temperature comprises measuring engine coolant temperature.

12. The method of claim 9 further comprising the step of locating a coolant temperature sensor near exhaust gases of the engine.

* * * * *